United States Patent
Tanaka et al.

(10) Patent No.: US 10,066,721 B2
(45) Date of Patent: Sep. 4, 2018

(54) FINAL DRIVE DEVICE

(71) Applicant: Nissan Motor Co., Ltd., Yokohama-shi, Kanagawa (JP)

(72) Inventors: Tetsumitsu Tanaka, Kanagawa (JP); Jitsuyuki Endou, Kanagawa (JP); Kenichi Sonowa, Kanagawa (JP); Mitsuo Yokozawa, Kanagawa (JP); Kazuhiro Takaki, Kanagawa (JP); Teppei Maki, Kanagawa (JP); Masakatsu Koide, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 15/318,397

(22) PCT Filed: Jul. 11, 2014

(86) PCT No.: PCT/JP2014/068638
§ 371 (c)(1),
(2) Date: Dec. 13, 2016

(87) PCT Pub. No.: WO2016/006117
PCT Pub. Date: Jan. 14, 2016

(65) Prior Publication Data
US 2017/0130813 A1 May 11, 2017

(51) Int. Cl.
*F16H 48/06* (2006.01)
*F16H 57/031* (2012.01)
(Continued)

(52) U.S. Cl.
CPC ............ *F16H 48/10* (2013.01); *F16H 48/06* (2013.01); *F16H 48/40* (2013.01); *F16H 57/031* (2013.01);
(Continued)

(58) Field of Classification Search
CPC .... F16H 48/10; F16H 48/40; F16H 2048/106; F16H 2048/102
See application file for complete search history.

(56) References Cited

U.S. PATENT DOCUMENTS

| 4,959,043 A * | 9/1990 | Klotz | F16H 48/08 |
|---|---|---|---|
| | | | 475/220 |
| 5,806,371 A | 9/1998 | Hibbler et al. | |
| 2007/0099740 A1 | 5/2007 | Gassmann et al. | |

FOREIGN PATENT DOCUMENTS

| DE | 103 12 348 A1 | 10/2004 |
|---|---|---|
| DE | 10 2011 117 797 A1 | 5/2013 |

(Continued)

*Primary Examiner* — Jacob S. Scott
*Assistant Examiner* — Lillian T Nguyen
(74) *Attorney, Agent, or Firm* — Global IP Counselors, LLP (57) ABSTRACT

A final drive device includes a housing and a final drive gear mechanism. The final drive gear mechanism is provided in the housing, and comprises a drive pinion and a ring gear meshed with the drive pinion and a differential gear mechanism. The differential gear mechanism includes a pinion rotatably supported by a pinion mate shaft, and a pair of side gears meshed with the pinion from both sides in an axle direction. The final drive device has a pinion carrier that is rotated in a direction around the axle integrally with the pinion mate shaft supporting the pinion, and which is secured to the ring gear. The pinion carrier is provided with a pinion housing unit that houses the pinion while permitting the pinion to rotate around its own axis. The side gears are fixedly located relative to the housing while being permitted to rotate around their own axes.

20 Claims, 7 Drawing Sheets

(51) Int. Cl.
*F16H 48/10* (2012.01)
*F16H 48/40* (2012.01)

(52) U.S. Cl.
CPC .. *F16H 2048/102* (2013.01); *F16H 2048/106* (2013.01); *F16H 2048/405* (2013.01)

(56) References Cited

FOREIGN PATENT DOCUMENTS

| | | | |
|---|---|---|---|
| JP | 2001-141040 A | 5/2001 | |
| JP | 2008-95724 A | 4/2008 | |
| JP | 2008-95774 A | 4/2008 | |
| JP | 2012-530222 A | 11/2012 | |
| JP | 2013-160369 A | 8/2013 | |
| WO | 2005/047043 A1 | 5/2005 | |
| WO | WO 2016006117 A1 * | 1/2016 | ............. F16H 48/06 |

* cited by examiner

FINAL DRIVE DEVICE

CROSS-REFERENCE TO RELATED APPLICATIONS

This application is a U.S. National stage application of International Application No. PCT/JP2014/068638, filed Jul. 11, 2014.

BACKGROUND

Field of the Invention

The present invention relates to a final drive unit with a built-in differential gear mechanism mounted on a drive system of a vehicle.

Background Information

A final drive device with a built-in differential gear mechanism used in a drive system of a vehicle is, for example, configured to subject the rotation of a propeller shaft to final deceleration by a final drive gear mechanism, and to output the decelerated propulsion to left and right drive wheels via a differential gear mechanism.

Japanese Unexamined Patent Application Publication No. 2012-530222 discloses a final drive device in which a differential gear mechanism is configured from a plate-like helical face gear and a helical pinion that meshes with the helical face gear, which are disposed in an opposed state, to shorten the axle direction dimension. This differential gear mechanism is built into a differential case, and the differential case is configured to be driven by a final drive gear mechanism comprising a drive pinion ring gear.

Japanese Laid Open Patent Application No. 2008-95774 discloses a final drive device in which the axle direction dimension is shortened by configuring a differential gear mechanism from a plate-like face gear and a spur gear pinion that meshes with the face gear, which are disposed in an opposed state, to shorten the axle direction dimension. This differential gear mechanism is built into a differential case, and the differential case is configured to be driven by a final drive gear mechanism comprising a drive pinion ring gear.

SUMMARY

However, with all of the conventional examples described above, a differential gear mechanism is built into a differential case, and the differential case is configured to be rotatably attached to a housing. Consequently, space for the differential case is required between the differential gear mechanism and the housing, which increases the axle direction dimension; therefore, there is the problem that the size of the final drive device is increased. On the other hand, a differential case is for fixing the positional relationships among the ring gear, the pinion gear, and the side gear, and is an important element in order to exert the function of a differential device, which cannot be simply discarded.

Therefore, an object of the present invention is to provide a final drive device that is miniaturized by shortening the axle direction dimension.

According to one aspect of the present invention, inside a housing, a final drive gear mechanism is provided with a final drive gear mechanism comprising a drive pinion and a ring gear meshed with the drive pinion, and a differential gear mechanism comprising a pinion rotatably supported by a pinion mate shaft and a pair of side gears meshed with the pinion from both sides in an axle direction; the final drive device has a pinion carrier rotated in a direction around the axle integral with the pinion mate shaft supporting the pinion, and which is fixed to the ring gear; the pinion carrier is provided with a pinion housing unit that houses the pinion while permitting the pinion to rotate around its own axis; and the pair of side gears meshed with the pinion are fixedly positioned relative to the housing while being permitted to rotate around their own axes.

BRIEF DESCRIPTION OF THE DRAWINGS

Embodiments of the present invention will be described below, with reference to the appended drawings.

Figure 1:
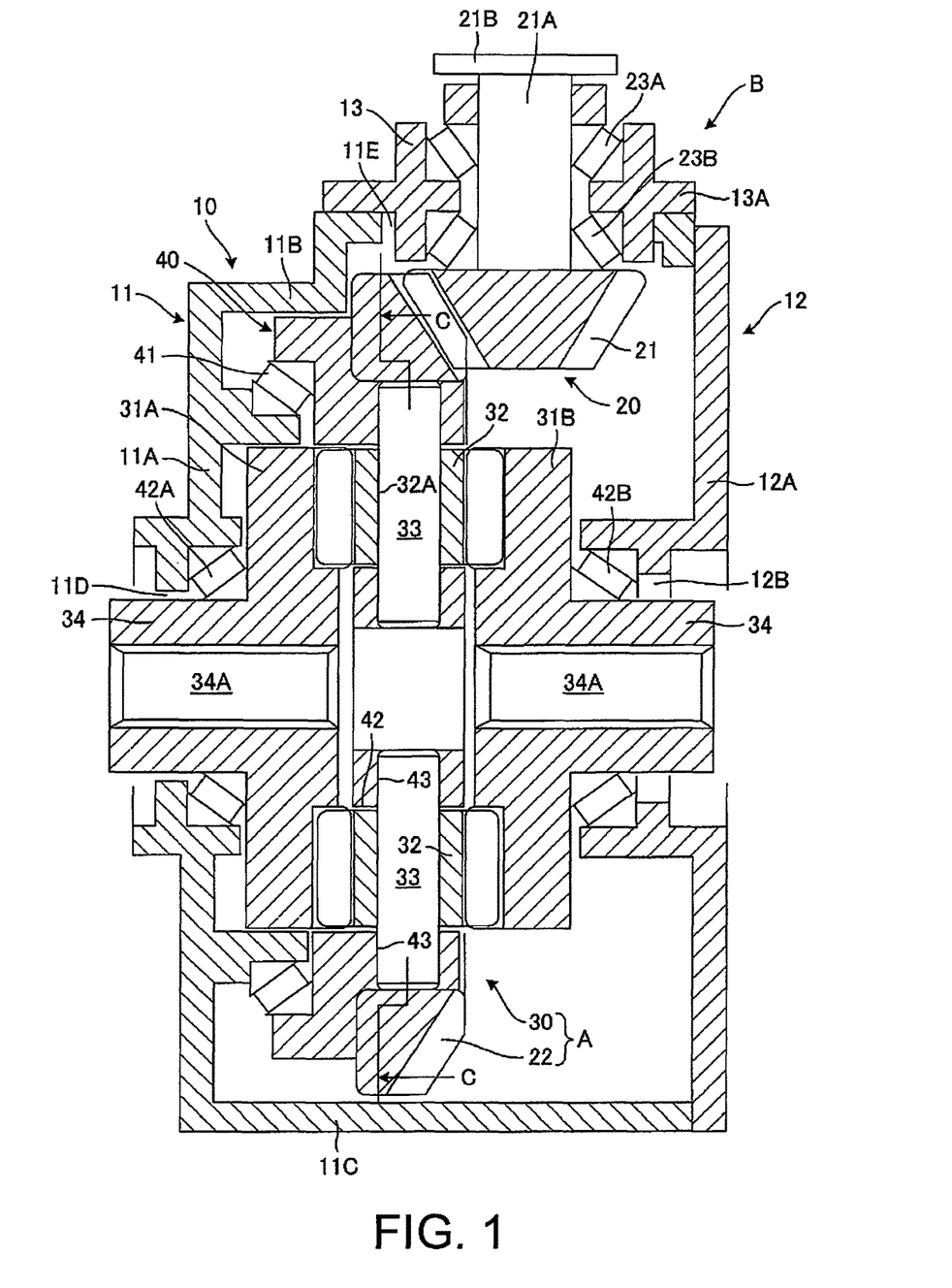
FIG. 1 is a schematic cross-sectional view illustrating the final drive device according to a first embodiment of the present invention.

FIG. 1 is a cross-sectional view illustrating a final drive device according to a first embodiment to which this invention is applied. The final drive device includes a housing 10 inside of which is provided a final drive gear mechanism 20 that carries out a final deceleration of a vehicle drive system, and a differential gear mechanism 30 that absorbs the rotational difference between the left and right drive wheels. The housing 10 is formed from a drive pinion retainer 13 that supports a drive pinion 21, a main body case 11 that houses the final drive gear mechanism 20 and the differential gear mechanism 30, and a retainer case 12 that closes the opening of the main body case 11.

The final drive gear mechanism 20 is provided with the drive pinion 21 (a hypoid pinion) that is driven by a propulsion shaft such as a propeller shaft, and a ring gear 22 (a hypoid ring gear) that meshes with the drive pinion 21.

The drive pinion 21 is integrally provided with a pinion shaft 21A. The pinion shaft 21A is rotatably supported on a drive pinion retainer 13 via a front bearing 23A and a rear bearing 23B. The drive pinion retainer 13 is attached to the main body case 11, which configures the housing 10, as described later. A flange 21B is provided on the vehicle front end portion of the pinion shaft 21A. The pinion shaft 21A is rotatably driven by a propeller shaft, etc., which is not shown, via the flange 21B.

The ring gear 22 is fixed to an annular pinion carrier 40. The pinion carrier 40 is rotatably supported on the housing 10 (here, the main body case 11) via a bearing 41. The pinion carrier 40 rotatably supports a plurality of pinions 32 of the differential gear mechanism 30, as described later. In the present embodiment, a portion of the rear surface and the inner perimeter surface of the ring gear 22 is fixed to a portion of the side surface and the outer perimeter surface of the pinion carrier 40 by, for example, welding or bolts, and the pinion carrier 40 and the ring gear 22 are integrally formed.

The differential gear mechanism 30 comprises a pair of side gears 31A and 31B comprising opposing face gears, and a plurality of (for example, four) pinions 32 that mesh with both opposing face gears.

The pair of side gears 31A and 31B are each provided with a disk-shaped face gear that meshes with the pinions 32 on the opposing surfaces. The face gear is a disk-shaped gear having a tooth shape that meshes with the pinions 32. The pair of side gears 31A and 31B are rotatable around the lateral direction axle in the drawing.

The pair of side gears 31A and 31B are provided with boss portions 34, each extending in the left and right direction of the drawing, which is the back surface, and comprising splines (or serrations) 34A on the inner surface. The pair of side gears 31A and 31B are rotatably supported on the housing 10 (here, main body case 11 and retainer case 12) via side bearings 42A and 42B that are disposed on the outer perimeters of the boss portions 34. In other words, the pair of side gears 31A and, 31B are rotatably supported directly on the housing 10 without interposing a differential case therebetween. The splines (or serrations) 34A of each boss portion 34 are splined (or serration bonded) with an axle shaft (axle) that is coupled to drive wheels, which are not shown.

The plurality of pinions 32 are configured from spur gears or helical gears. The plurality of pinions 32 are rotatably supported by a plurality of pinion mate shafts 33, four of which are respectively arranged in the radial direction in a location that is orthogonal to the rotational axis of the side gears 31A and 31B (that is, in a plane that is orthogonal to the surface of the drawing). The plurality of pinion mate shafts 33 are attached to the pinion carrier 40 at the proximal ends and the distal ends, as described later. The number of the pinion mate shafts 33 in the drawing is four, but no limitation is imposed thereby.

Figure 2:
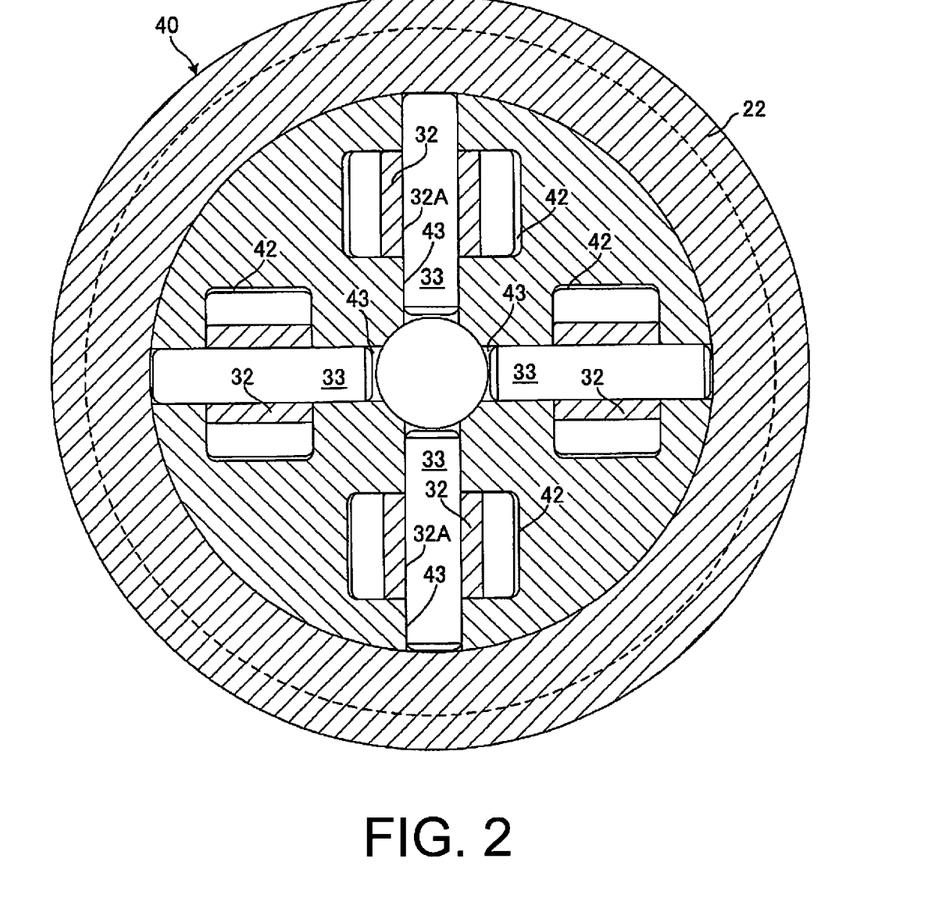
FIG. 2 is a cross-sectional view of the final drive device taken along line C-C of FIG. 1.

Referring to FIG. 2, the pinion carrier 40 comprises pinion housing holes 42 for respectively housing the pinions 32 that extend through in the rotational axis direction described above. In addition, the pinion carrier 40 comprises a shaft hole 43 that is orthogonal to the axle and that is in communication with each pinion housing hole 42. Then, each pinion 32 is rotatably supported around the pinion mate shaft 33, by housing the pinions 32 in each pinion housing hole 42 and inserting the pinion mate shafts 33 into the shaft hole 43 and the shaft holes 32A of the pinions 32.

Each pinion 32 is attached to the pinion mate shaft 33 in a state in which gear teeth protrude on both sides of the side gears 31A and 31B in the rotational axis direction described above, and the gear teeth respectively mesh with both side gears 31A and 31B (face gears). Each pinion 32 is integrally rotatable (revolution) with the pinion carrier 40, and when there is a differential between the side gears 31A and 31B, the pinion becomes rotatable (rotation) around the pinion mate shaft 33 with respect to the pinion carrier 40.

The tip of each shaft hole 43 is opened to the outer perimeter surface of the pinion carrier 40 to which the inner perimeter surface of the ring gear 22 is fitted. Accordingly, each pinion mate shaft 33 is respectively inserted from the outer perimeter surface of the pinion carrier 40 into the shaft hole 43, then stopped by fitting the ring gear 22 to the outer perimeter surface.

As described above, the pinion carrier 40, the ring gear 22, and the pinions 32 of the differential gear mechanism 30 configure an integrated assembly. Accordingly, it is possible to configure a differential ring gear assembly A in which a differential gear mechanism 30 and a ring gear 22 are combined, by assembling the pair of side gears 31A and 31B to the assembly described above.

On the other hand, the drive pinion retainer 13 houses a front bearing 23A and a rear bearing 23B, and rotatably supports the pinion shaft 21A and the drive pinion 21. A mounting flange 13A is formed on the outer perimeter of the drive pinion retainer 13. The drive pinion retainer 13, the front bearing 23A, and the rear bearing 23B, as well as the pinion shaft 21A and the drive pinion 21 may be integrated in an assembled state to configure a drive pinion unit B. Accordingly, these components may be attached to and detached from the housing 10 (main body case 11) as the drive pinion unit B.

The main body case 11 is formed in a bottomed cylindrical shape, comprising one side wall 11A that supports the bearings, a front wall 11B, a rear wall 11C, which extend in a tubular shape from the one side wall 11A, and upper and lower walls, which are not shown. The main body case 11 houses the final drive gear, mechanism 20 and the differential gear mechanism 30 therein. The main body case 11 rotatably supports the pinion carrier 40 with a bearing 41 that is supported to a cylindrical projection that is provided on one side wall 11A serving as the bottom. In addition, the main body case 11 rotatably supports one side gear 31A with a side bearing 42A that is supported on one side wall serving as the bottom. Additionally, the main body case 11 is provided with a through-hole 11D in one side wall 11A serving as the bottom, through which the boss portion 34 of one side gear 31A extends.

In addition, the front wall 11B of the main body case 11 is provided with an opening 11E for receiving the drive pinion 21 into the main body case 11. Then, the drive pinion 21 is received in the main body case 11 through the opening 11E. Then, the drive pinion 21 is fixed to the main body case 11 and held by fixing the mounting flange 13A of the drive pinion retainer 13 to the edge of the opening 11E of the front wall 11B.

The retainer case 12 is attached to the distal end (opening end) of the front wall 11B, the rear wall 11C, and the upper and lower walls of the main body case 11 so as to close the open portion of the main body case 11, to form the other side wall 12A of the housing 10. The retainer case 12 rotatably supports the other side gear 31B with a side bearing 42B that is supported on a cylindrical projection that is provided to the other side wall 12A. In addition, the other side wall 12A is provided with a through-hole 12B through which the boss portion 34 of the other side gear 31B is extended.

Figure 3:
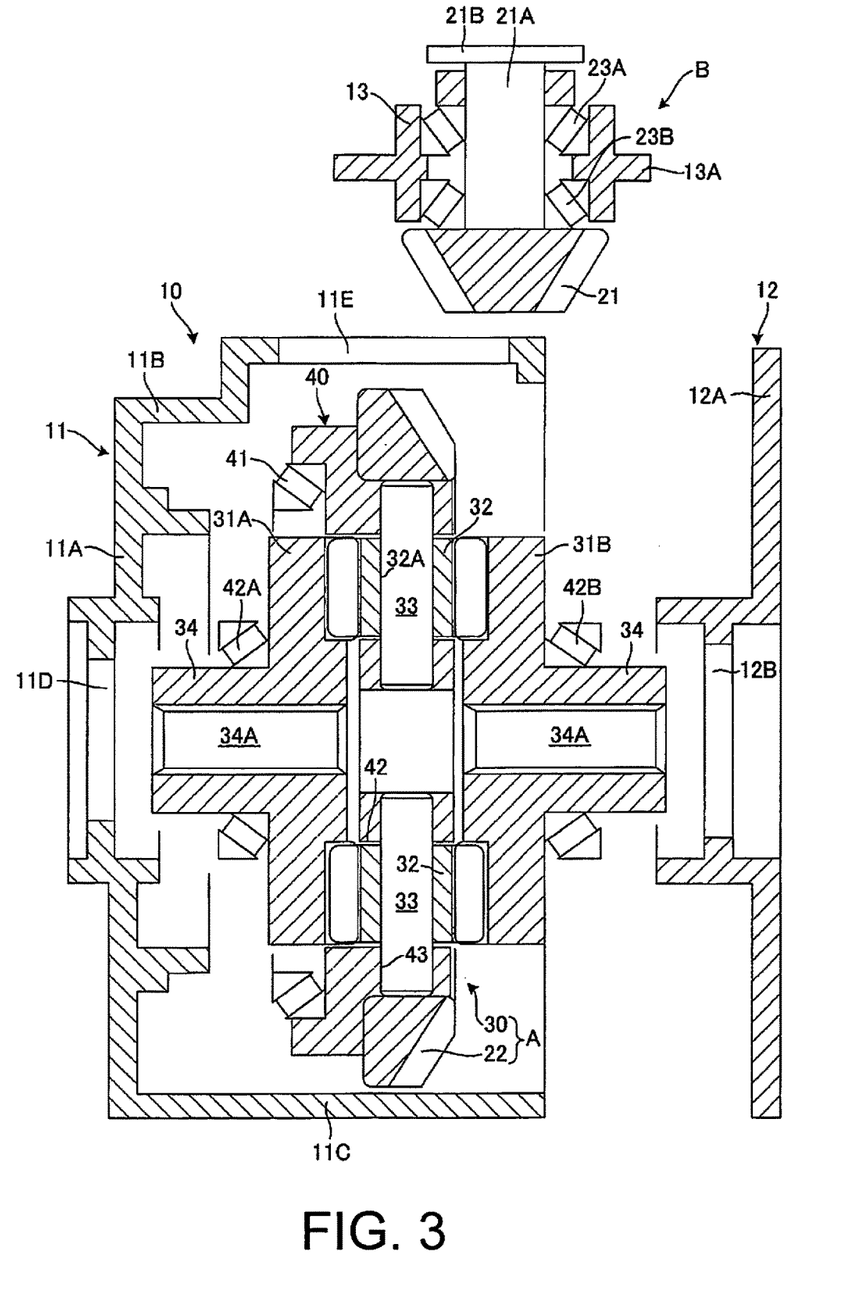
FIG. 3 is an exploded view illustrating the disassembled state of the final drive device according to the first embodiment.

FIG. 3 is a schematic cross-sectional view illustrating the disassembled state of the final drive device according to the present embodiment.

This final drive device may be divided into four components: the main body case 11, the retainer case 12, the drive pinion unit B, and the differential ring gear assembly A. Accordingly, in this final drive device, the main body case 11, the retainer case 12, the drive pinion unit B, and the differential ring gear assembly A may each be independently assembled. Then, the individually assembled main body case 11, retainer case 12, drive pinion unit B, and differential ring gear assembly A are combined as follows. That is, the assembly of the final drive device can be completed by first assembling the differential ring gear assembly A to the main body case 11, then attaching the retainer case 12, and finally by attaching the drive pinion unit B thereto.

Such a final drive device is rotatably driven with the pinion shaft 21A as the input side. The ring gear 22 that meshes with the drive pinion 21 is rotated with the pinion carrier 40 by the rotation of the pinion shaft 21A. The pinions 32 of the differential gear mechanism 30 are revolved by the rotation of the pinion carrier 40. Both side gears 31A and 31B that mesh with the pinions 32 are rotated, and both axle shafts that are respectively coupled to the two side gears 31A and 31B are rotationally driven, by the revolution of the pinions 32. In addition, if there is a differential in the rotations of the two side gears 31A and 31B, the pinions 32 rotate around the pinion mate shafts 33 while rotationally driving the two axle shafts, so as to absorb the differential rotation.

The drive pinion 21 and the ring gear 22 are immersed in lubricating oil that is retained in the housing 10. Accordingly, by the drive pinion 21 and the ring gear 22 being rotationally driven, lubricating oil is circulated by these gears in the housing 10. The circulating lubricating oil lubricates inside the housing 10, not only the meshing portions of the final drive gear mechanism 20 and the differential gear mechanism 30, but also each of the parts inside the housing 10, such as the bearings 41, 42A, 42B, 23A, and 23B. Accordingly, lubrication of each of the parts inside the housing 10, such as the bearings 41, 42A, 42B, 23A, and 23B, can be carried out by the lubricating oil that is supplied in order to lubricate the meshing portions of the final drive gear mechanism 20 and the differential gear mechanism 30. Therefore, a smooth rotation of the pinion carrier 40 and the side gears 31A and 31B relative to the housing 10 can be realized, and it is possible to maintain the function of the differential by supplying lubricating oil in the same manner as is conventional.

Figure 4:
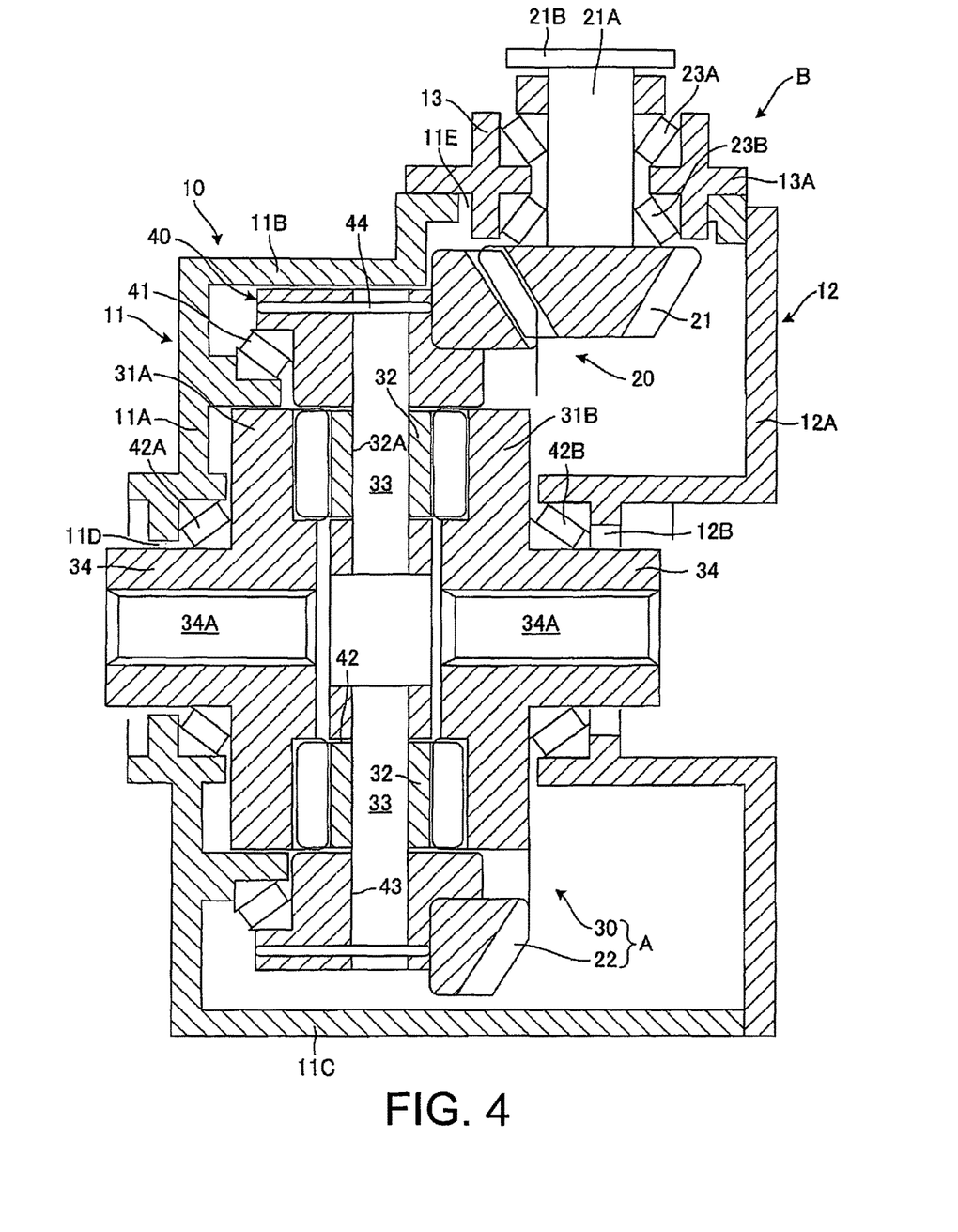
FIG. 4 is a schematic cross-sectional view of a final drive device according to a modified example of the first embodiment.

FIG. 4 is a schematic cross-sectional view illustrating the final drive device according to a modified example of the present embodiment.

In the final drive device of the present modified example, the ring gear 22 is disposed in a position that is closer to the side wall 12A side (right side in the drawing) compared to the position on the pinion mate shaft 33 illustrated in FIG. 1, and is in a state of being fixed to the pinion carrier 40 in this position. That is, the ring gear 22 is offset to the side wall 12A side with respect to the pinions 32. The distal end sides of the shaft holes 43 of the pinion carrier 40 are positioned on the opening end that communicates with a space inside the main body case 11. Accordingly, a stop pin 44 is provided as a stopper for the pinion mate shafts 33 that are inserted in the shaft hole 43, with the pinion carrier 40 and the pinion mate shafts 33 extending therethrough in the axial direction.

In addition, compared to the form shown in FIG. 1, the drive pinion 21 is disposed away from the differential gear mechanism 30 by the offset amount of the ring gear 22 with respect to the pinions 32 in the side wall 12A direction. The other configurations are the same as the configurations shown in FIG. 1 and FIG. 2.

In the present modified example, the ring gear 22 is not fitted to the distal end sides of the shaft hole 43 of the pinion carrier 40, and the distal ends of the shaft holes 43 are open. Accordingly, even after the assembly of the pinion carrier 40, the ring gear 22, and the pinions 32 of the differential gear mechanism 30 is assembled, and even at the time of disassembly, it is possible to extract and easily replace the pinion mate shaft 33, by extracting the stop pin 44. In addition, at this time, since it is not necessary to remove the ring gear 22 from the pinion carrier 40, it is possible to fix and integrate the pinion carrier 40 and the ring gear 22 by welding or the like.

According to the final drive device of the present embodiment described above, the following effects are obtained.

The final drive device inside housing 10 is provided with a final drive gear mechanism 20 and a differential gear mechanism 30. The final drive gear mechanism 20 is configured by a drive pinion 21 and a ring gear 22 that meshes with the drive pinion 21. The differential gear mechanism 30 is configured by pinions 32 that are rotatably supported on the pinion mate shafts 33 and a pair of side gears 31A and 31B meshed with the pinions 32 from both sides in the axle direction. The final drive device comprises a pinion carrier 40 that is rotated in a direction around the axle integrally with the pinion mate shafts 33 supporting the pinions 32, and that is fixed to the ring gear 22; the pinion carrier 40 is provided with pinion housing holes 42 that house the pinions 32 while permitting the pinions 32 to rotate around their own axes. Additionally, the pair of side gears 31A and 31B are fixedly positioned relative to the housing 10 while being permitted to rotate around their own axes.

Therefore, the positional relationships between the ring gear 22 and the pinions 32 are fixed by the pinion carrier 40 and the side gears 31A and 31B are also positionally fixed with respect to the housing 10; therefore, the positional fixing function and the differential function described above are exerted even without a conventional differential case. It is thereby possible to prevent an increase in the axle direction (lateral direction in the drawing) dimension caused by the presence of a differential case, and it is possible to reduce the size of the axle direction dimension of the final drive device.

Moreover, since the side gears 31A and 31B that configure the differential gear mechanism 30 are configured from disk-shaped face gears that mesh with pinions 32, which are configured by spur gears or helical spur gears, it is possible to shorten the axle direction dimension thereof, and it is possible to reduce the size of the axle direction dimension of the final drive device in this respect as well.

Additionally, in the final drive device of the present embodiment, a ring gear 22 is fixed to and supported by pinion carrier 40, which rotatably supports pinions 32 that configure the differential gear mechanism 30. Furthermore, the pinion carrier 40 is positionally fixed to the housing 10 while being permitted to integrally rotate with the pinion mate shafts 33 around the axle. Therefore, since the pinion carrier 40 takes on a stable, positionally fixed state with respect to the housing 10, the ring gear 22 that is fixed to and supported by pinion carrier 40 also takes on a stable, positionally fixed state; as a result, it is possible to secure accurate teeth contact between the ring gear 22 and the drive pinion 21. In addition, it is possible to secure accurate teeth contact between the pinions 32 and the side gears 31A and 31B. Furthermore, in the final drive device of the present embodiment, the pinion carrier 40 is extended in the longitudinal direction of the vehicle body along the pinion mate shafts 33. Therefore, the pinion carrier 40 does not advance from the pinion mate shafts 33 outwardly in the axle direction, and does not enter the sides of the side gears 31A and 31B. Therefore, since it is not necessary to form a space for disposing a differential case between the main body case 11 and the side portion of the side gear 31A, as in the prior art, it is possible to reliably reduce the axle direction dimension by the amount corresponding to the reduction in the required space.

Furthermore, in the final drive device of the present embodiment, a housing 10 is configured from a main body case 11 that incorporates a final drive gear mechanism 20 and a differential gear mechanism 30, in which one end (the right end in the drawing) in the axle direction is open, and in which the side gear 31A on one side in the axle direction and the one side of the pinion carrier 40 in the axle direction (the left side portion in the drawing) are rotatably supported via bearings 41 and 42A; a retainer case 12 mounted to the open side of the main body case 11 in the axle direction, and in which the side gear 31B on the other side of the differential gear mechanism 30 in the axle direction is rotatably supported via the bearing 42B; and a drive pinion retainer 13 fixed to the edge of an opening 11E provided on the vehicle body front side of the main body case 11, and in which the pinion shaft 21A of the drive pinion 21 are rotatably supported via the bearings 23A, 23B.

By employing such a block structure, it is possible to complete the assembly by assembling the drive pinion unit B and the differential ring gear assembly A in advance, mounting the differential ring gear assembly A to the main body case 11, mounting the retainer case 12 next, and finally mounting the drive pinion unit B thereto. The differential ring gear assembly A can be configured by integrally assembling the pinion carrier 40, the ring gear 22, and the pinions 32 of the differential gear mechanism 30, combining the pair of side gears 31A and 31B next, and then combining the differential gear mechanism 30 and the ring gear 22. Furthermore, the drive pinion unit B can be configured by combining the drive pinion retainer 13, the front bearing 23A and the rear bearing 23B, as well as the pinion shaft 21A and the drive pinion 21. Therefore, in the final drive device of the present embodiment, it is possible to easily assemble the differential gear mechanism 30 inside the hosing 10 without using a differential case.

When configuring the pinions 32 that configure the differential gear mechanism 30 as spur gears, the structure may be one in which load is not generated in the thrust direction (the axial direction of the pinion mate shafts 33). Accordingly, it is possible to employ a strength design without assuming the generation of a thrust load, even with respect to a pinion carrier 40 that rotatably supports the pinions 32; therefore, it is possible to reduce weight.

Figure 5:
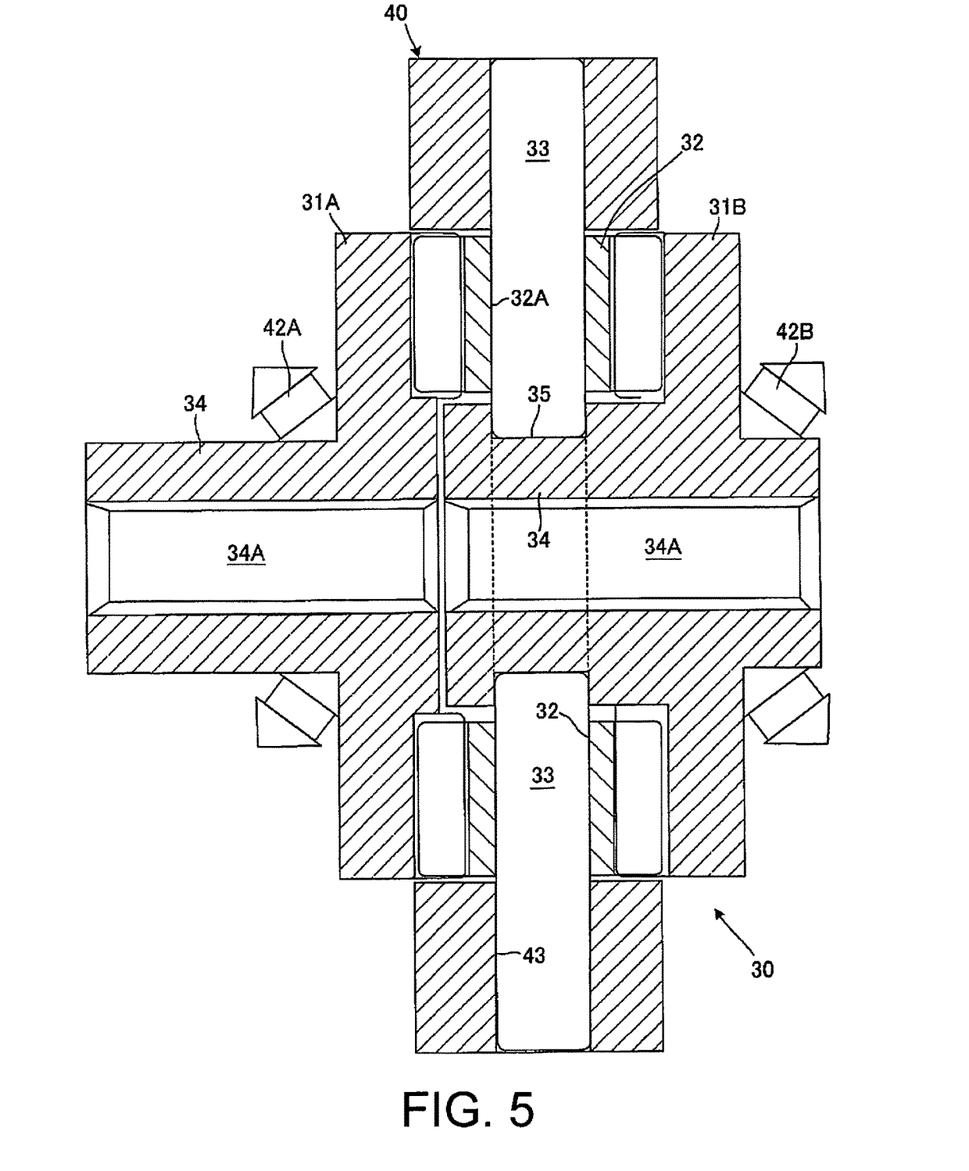
FIG. 5 is a cross-sectional view of the principle part of the final drive device according to a second embodiment of the present invention.
Figure 6:
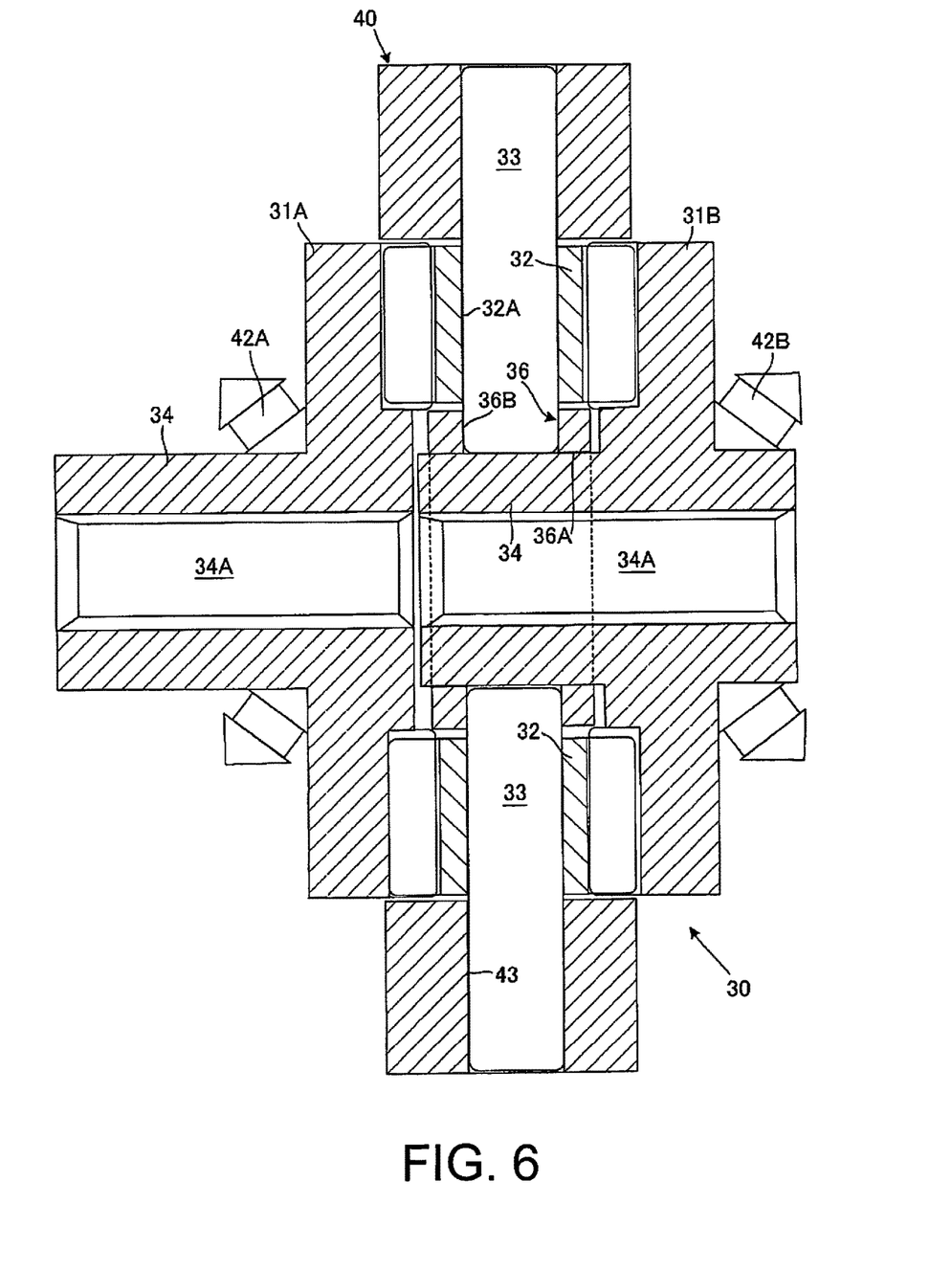
FIG. 6 is a cross-sectional view of the principle part of the final drive device according to a modified example of the second embodiment.
Figure 7:
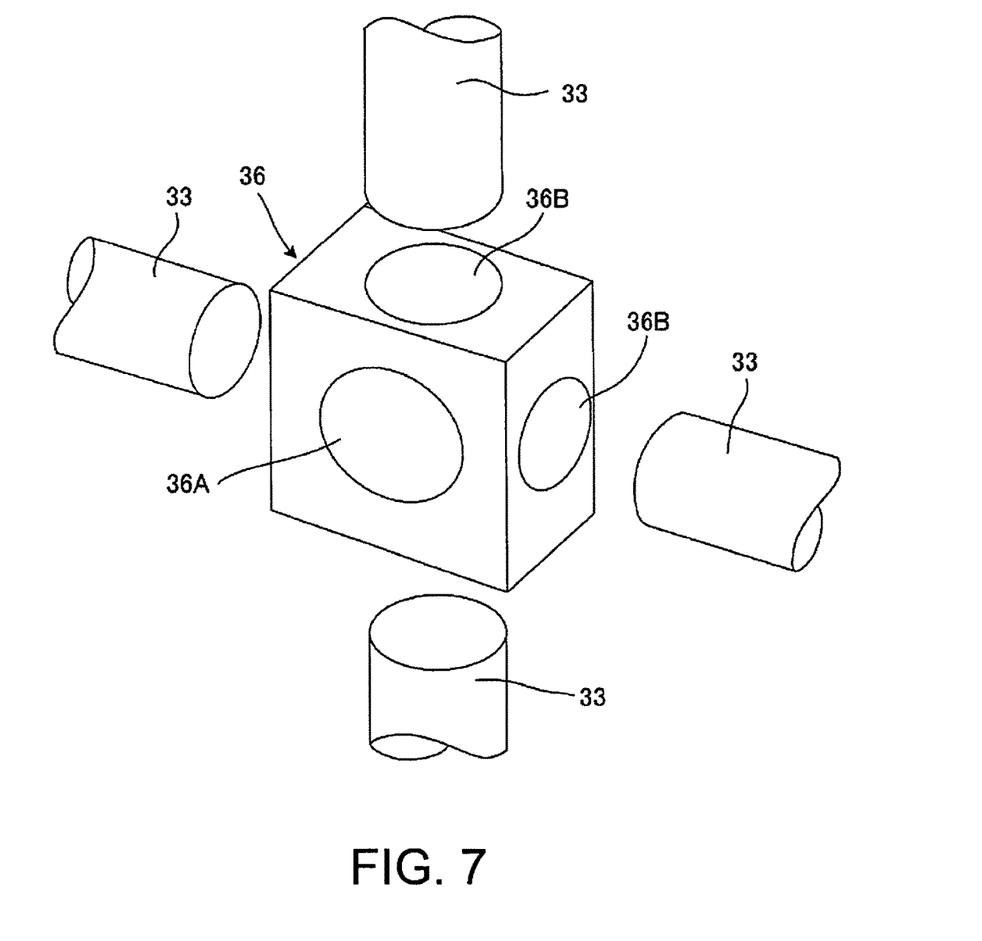
FIG. 7 is a perspective view illustrating a box member in the final drive device according to a modified example.

FIGS. 5 to 7 illustrate the final drive device according to the second embodiment to which this invention is applied. FIG. 5 is a cross-sectional view of the principle part of the final drive device according to the present embodiment, and FIGS. 6 and 7 are a perspective view and a cross-sectional view, respectively, of the principle part of the final drive device of a modified example. In the present embodiment, a configuration is added to the first embodiment, in which the boss portion 34 of either one side gear 31B (or 31A) is extended to the proximal end portion of the pinion mate shaft 33. The same devices as the first embodiment are given the same reference symbols, and the explanations thereof are omitted or simplified.

In the final drive device illustrated in FIG. 5, the boss portion 34 of either one (the other, in the illustrated example) of the side gears 31B (31A) is extended to an area up to the proximal end portions of the pinion mate shafts 33. Along with the above, the support structure of the proximal ends of the pinion mate shafts 33 are changed as follows. That is, in contrast to the first embodiment in which the proximal ends of the pinion mate shafts 33 are supported in the inner diameter side region of the pinion carrier 40, in the present embodiment, a circumferential groove 35 is formed in the outer perimeter of the boss portion 34, and the proximal ends of the pinion mate shafts 33 are inserted in the circumferential groove 35 to be supported. As a result, the pinion mate shafts 33 have cantilever structures in which only the distal end region is supported by the pinion carrier 40. The other configurations are configured in the same manner as in the first embodiment.

However, as described above, when forming the pinions 32, which are supported by the pinion mate shafts 33, from a spur gear, a load in the thrust direction (axial direction of the pinion mate shaft 33) does not act; thus, it is sufficient to provide purely a strength with which it is possible to withstand the drive torque. Accordingly, it is possible to secure durability by improving the bonding strength between the pinion mate shafts 33 and the shaft hole 43 provided in the pinion carrier 40.

This final drive device comprises a structure in which the boss portion 34 of either one of the side gears 31B (31A) is formed extending to the proximal end portions of the pinion mate shafts 33. It is necessary to ensure the strength of the splines 34A, which are disposed on the inner surface of the boss portion 34 with which it is possible to transmit a drive force to the axle shaft; therefore the length of the splines cannot be shortened. Accordingly, by forming the boss portion 34 to extend to the proximal end portions of the pinion mate shafts 33, it is possible to reduce the bulging from the side gear 31B (31A) in the axle direction outside region, while maintaining the axle direction dimension of the boss portion 34. As a result, it is possible to further reduce the size of the axle direction dimension of the final drive device.

Additionally, grooves 35 are formed that sandwich and hold the proximal ends of the pinion mate shafts 33 from both sides in the axle direction, on the outer perimeter surface of the boss portion 34 that is formed by extending to the proximal end portion of the pinion mate shafts 33. A plurality of, for example three or more (four in the drawing), pinion mate shafts 33 are provided. By the proximal ends of the pinion mate shafts 33 being inserted in the groove 35 that is provided on the outer perimeter of the boss portion 34, the proximal ends can be positioned and held in the axial direction. Therefore, most of the meshing reaction force with the side gears 31A and 31B that is applied to the pinion mate shafts 33 is allocated to the pinion carrier 40, but it is possible to share a portion thereof with the boss portion 34.

The final drive device of a modified example illustrated in FIGS. 6 and 7 is one where a configuration in which the proximal ends of a plurality of pinion mate shafts 33 are supported by a box member 36 on the outer perimeter of the boss portion 34, instead of being supported by the boss portion 34, is added to the form of FIG. 5. A support hole 36A that is supported on the outer perimeter surface of the boss portion 34 extended between the side gears 31A, 31B, and a plurality of shaft holes 36B to which the proximal ends of the pinion mate shafts 33 are fitted, are formed in the box member 36, as illustrated in FIG. 7.

The box member 36 is rotatably disposed on the boss portion 34 while having a support hole 36A on the outer perimeter surface of the boss portion 34, formed extending in the region sandwiched by the two side gears 31A and 31B, as illustrated in FIG. 6. The proximal end of each pinion mate shaft 33 is inserted in one of the plurality of shaft holes 36B provided in the box member 36 in the radial direction, and supported by the box member 36 from the proximal end side. That is, the proximal end of each pinion mate shaft 33 is supported by being fitted in a shaft hole 36B of the box member 36, and the distal end is supported to the shaft hole 43 of the pinion carrier 40. Accordingly, most of the meshing reaction force with the side gears 31A and 31B, and the pinions 32 that is applied to the pinion mate shafts 33 is allocated to the pinion carrier 40, but it is possible to share a portion thereof with the boss member 36. As a result, it is possible to obtain an effect of reinforcing the supporting rigidity of each pinion mate shaft 33.

In addition, since the pinion carrier 40, the pinions 32, and the two side gears 31A and 31B are integrally rotated when there is no differential in the differential gear mechanism 30, the box member 36 is integrally rotated with respect to the boss portions 34 of the side gears 31A and 31B, without being accompanied by relative rotation. Furthermore, if there is a differential in the differential gear mechanism 30, since the pinion carrier 40 and the pinions 32 are rotated relatively with respect to the two side gears 31A and 31B, the box member 36 is also relatively rotated with respect to the boss portions 34 of the side gears 31A and 31B, generating sliding friction between the two. Accordingly, it is possible to prevent burn-ins, etc., with respect to the boss portion 34 by configuring the box member 36 from a material that has excellent lubricity (for example a copper alloy consisting of about 90% copper and 10% tin, or so-called gunmetal).

According to the final drive device of the present embodiment described above, the following effects are obtained in addition to the effects of the first embodiment.

In the final drive device of the present embodiment, the boss portion 34 of either one of the side gears 31B (31A) is formed extending in the region sandwiched by the two side gears 31A and 31B. Accordingly, it is possible to maintain the axle direction dimension of the boss portion 34, which cannot be shortened to ensure the strength of the splines 34A that are disposed on the inner surface, while reducing the bulging from the side gear 31B (31A) to the axle direction outside region. As a result, it is possible to further reduce the size of the axle direction dimension of the final drive device.

In the final drive device of the embodiment illustrated in FIG. 5, grooves 35 are formed that sandwich and hold the proximal ends of the pinion mate shafts 33 from both sides in the axle direction, on the outer perimeter surface of the boss portion 34 that is formed extending to the proximal end portions of the pinion mate shafts 33. Accordingly, when disposing a plurality, for example three or more, of pinion mate shafts 33, the proximal ends thereof can be positioned, and the meshing reaction force with the side gears can be shared by being held in the axle direction.

In the final drive device of the modified example, a box member 36 is rotatably fitted to the outer perimeter surface of the boss portion 34 that is extended in a region sandwiched by the two side gears 31A and 31B, and the proximal end of the pinion mate shafts 33 are supported in the box member 36. That is, the proximal end of each pinion mate shaft 33 is supported by being fitted in the support hole 36A of the box member 36, and the distal end is supported to the shaft hole 43 of the pinion carrier 40. Accordingly, it is possible to improve the supporting rigidity of each pinion mate shaft 33.

Embodiments of the present invention were described above, but the above-described embodiments illustrate only a portion of the application examples of the present invention, and are not intended to limit the technical scope of the present invention to the specific configurations of the above-described embodiments.

The invention claimed is:

1. A final drive device comprising:
a housing;
a final drive gear mechanism provided in the housing, the final drive gear mechanism comprising a drive pinion, a ring gear meshed with the drive pinion and a differential gear mechanism which comprises a pinion rotatably supported on a pinion mate shaft and a pair of side gears meshed with the pinion from both sides in a rotational axis direction of the side gears;
a pinion carrier that is fixed to the ring gear and rotatable about the rotational axis; and
the pinion carrier including a pinion housing hole that houses the pinion while permitting the pinion to rotate around the pinion mate shaft, and
the pair of side gears being meshed with the pinion and being fixedly positioned relative to the housing while being permitted to rotate around the rotational axis,
the pinion carrier including a shaft hole that is orthogonal to the rotational axis, the pinion mate shaft being inserted into the shaft hole.

2. The final drive device according to claim 1, wherein the pinion carrier is positionally fixed relative to the housing while being permitted to integrally rotate together with the pinion mate shaft in a direction around the rotational axis.

3. The final drive device according to claim 2, wherein the pair of side gears are configured as face gears; and the pinion of the differential gear mechanism is configured as a spur gear.

4. The final drive device according to claim 2, wherein the pair of side gears each comprise a boss portion configured to receive an axle; and a portion of one of the side gears extends to a proximal end portion of the pinion mate shaft.

5. The final drive device according to claim 4, wherein the portion that extends to the proximal end portion of the pinion mate shaft has grooves formed on an outer perimeter surface thereof to sandwich and abuttingly hold the proximal end portion of the pinion mate shaft from both sides in the rotational axis direction.

6. The final drive device according to claim 4, wherein a box member is rotatably fitted on an outer perimeter surface of the boss portion that extends in a region sandwiched by the two side gears; and the proximal end portion of the pinion mate shaft is supported in the box member.

7. The final drive device according to claim 1, wherein the housing includes:
a main body case incorporating the final drive gear mechanism and the differential gear mechanism, the main body case has an open end on a first side of the differential gear mechanism with respect to the rotational axis direction, the main body case rotatably supporting via bearings one of the pair of side gears that is located on the first side of the differential gear mechanism with respect to the rotational axis direction and a first side portion of the pinion carrier with respect to the rotational axis direction;
a retainer case mounted to the open end of the first side of the main body case, and the retainer case rotatably supporting via an axle bearing the other of the pair of side gears located on a second side of the differential gear mechanism with respect to the rotational axis direction; and
a drive pinion retainer fixed to an edge of an opening that is provided on a vehicle body front side of the main body case, and the drive pinion retainer rotatably supported via an axle bearing a pinion shaft of the drive pinion.

8. The final drive device according to claim 7, wherein the pair of side gears are configured as face gears; and the pinion of the differential gear mechanism is configured as a spur gear.

9. The final drive device according to claim 7, wherein
the pair of side gears each comprise a boss portion configured to receive an axle; and
a portion of one of the side gears extends to a proximal end portion of the pinion mate shaft.

10. The final drive device according to claim 9, wherein
the portion that extends to the proximal end portion of the pinion mate shaft has grooves formed on an outer perimeter surface thereof to sandwich and abuttingly hold the proximal end portion of the pinion mate shaft from both sides in the rotational axis direction.

11. The final drive device according to claim 9, wherein
a box member is rotatably fitted on an outer perimeter surface of the boss portion that extends in a region sandwiched by the two side gears; and
the proximal end portion of the pinion mate shaft is supported in the box member.

12. The final drive device according to claim 1, wherein
the pair of side gears are configured as face gears; and
the pinion of the differential gear mechanism is configured as a spur gear.

13. The final drive device according to claim 12, wherein
the pair of side gears each comprise a boss portion configured to receive an axle; and
a portion of one of the side gears extends to a proximal end portion of the pinion mate shaft.

14. The final drive device according to claim 13, wherein
the portion that extends to the proximal end portion of the pinion mate shaft has grooves formed on an outer perimeter surface thereof to sandwich and abuttingly hold the proximal end portion of the pinion mate shaft from both sides in the rotational axis direction.

15. The final drive device according to claim 13, wherein
a box member is rotatably fitted on an outer perimeter surface of the boss portion that extends in a region sandwiched by the two side gears; and
the proximal end portion of the pinion mate shaft is supported in the box member.

16. The final drive device according to claim 1, wherein
the pair of side gears each comprise a boss portion configured to receive an axle; and
a portion of one of the side gears extends to a proximal end portion of the pinion mate shaft.

17. The final drive device according to claim 16, wherein
the portion that extends to the proximal end portion of the pinion mate shaft has grooves formed on an outer perimeter surface thereof to sandwich and abuttingly hold the proximal end portion of the pinion mate shaft from both sides in the rotational axis direction.

18. The final drive device according to claim 16, wherein
a box member is rotatably fitted on an outer perimeter surface of the boss portion that extends in a region sandwiched by the two side gears; and
the proximal end portion of the pinion mate shaft is supported in the box member.

19. The final drive device according to claim 1, wherein
the shaft hole opens at an outer perimeter surface of the pinion carrier such that the pinion mate shaft can be inserted from the outer perimeter surface.

20. The final drive device according to claim 1, wherein
the pinion mate shaft includes a plurality of pinion mate shafts, and
the shaft hole includes a plurality of shaft holes formed in the pinion carrier, one of the pinion mate shafts being inserted into each of the shaft holes.

\* \* \* \* \*